United States Patent [19]

Jordan

[11] 4,159,103
[45] Jun. 26, 1979

[54] SLEEVE ACTUATED VALVE

[76] Inventor: Chalmer C. Jordan, Perry Hwy., Saegertown, Pa. 16433

[21] Appl. No.: 809,669

[22] Filed: Jun. 24, 1977

[51] Int. Cl.² ............................................. F16K 51/00
[52] U.S. Cl. ....................................... 251/340; 251/284
[58] Field of Search ............... 251/340, 347, 284, 344; 137/533.17

[56] References Cited

U.S. PATENT DOCUMENTS

| 1,956,981 | 5/1934 | Crowley | 251/340 |
| 2,325,325 | 7/1943 | Kiene | 251/340 |
| 2,564,023 | 8/1951 | Miller | 137/533.17 |
| 2,612,337 | 9/1952 | Maynard | 251/340 |
| 3,210,056 | 10/1965 | Van't Sant | 132/533.17 |
| 3,263,701 | 8/1966 | Johnson | 137/533.17 |
| 3,425,664 | 2/1969 | Niskin | 251/344 |
| 3,513,485 | 5/1970 | Davila | 137/533.12 |
| 3,559,952 | 2/1971 | Skinner | 251/347 |
| 3,856,262 | 12/1974 | Jordan | 251/340 |
| 3,985,332 | 10/1976 | Walker | 251/340 |

Primary Examiner—William R. Cline
Assistant Examiner—H. Jay Spiegel
Attorney, Agent, or Firm—Charles L. Lovercheck

[57] ABSTRACT

A valve made up of a body and a sleeve telescopically received in the body. A hand wheel is concentrically received on the sleeve and threadably received on the body for moving the sleeve axially of the body. A seal is provided in the body between the body and the sleeve. The seal closes the flow passage between the body and the sleeve when the sleeve is moved to one extreme position and opens the flow passage when the sleeve is moved to another extreme position. The sleeve is noncircular so that it will not rotate relative to the body. The valve is suitable for use on hot water tanks and the like for closing off the flow of water. The body has axially extending hooks that engage the body when the seal is moved to the open position so that the relative movement of the sleeve and body are limited and the sleeve and body will not separate.

1 Claim, 5 Drawing Figures

SLEEVE ACTUATED VALVE

OBJECTS OF THE INVENTION

It is an object of the invention to provide an improved valve with a stop to limit the relative movement of the valve body and sleeve.

Another object of the invention is to provide a valve that is simple in construction, economical to manufacture, and simple and efficient to use.

Another object of the invention is to provide an improved combination seal and sleeve arrangement.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

REFERENCE TO PRIOR ART

This disclosure is an improvement over U.S. Pat. No. 3,856,262 issued Dec. 24, 1974, to Chalmer C. Jordan.

GENERAL DESCRIPTION OF THE DRAWINGS

DETAILED DESCRIPTION OF THE DRAWINGS

Figure 1:
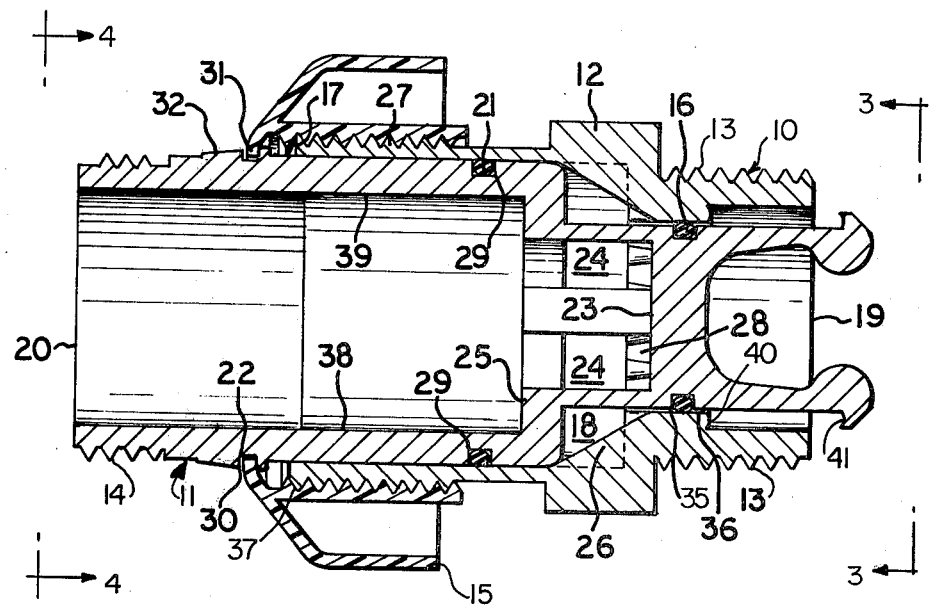
FIG. 1 is a longitudinal, cross-sectional view of a coupling according to the invention.
Figure 2:
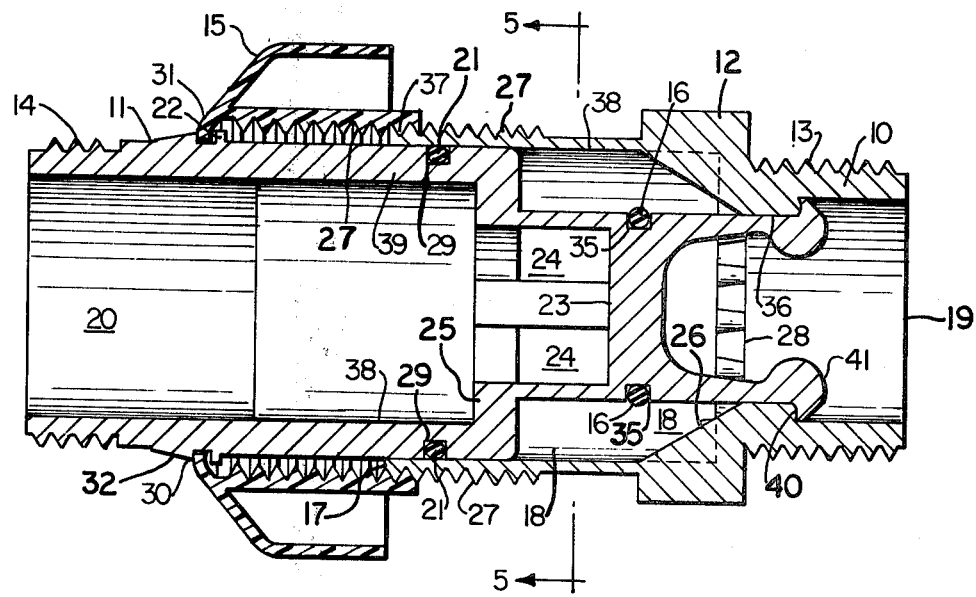
FIG. 2 is a view similar to FIG. 1, but shown in open position.
Figure 3:
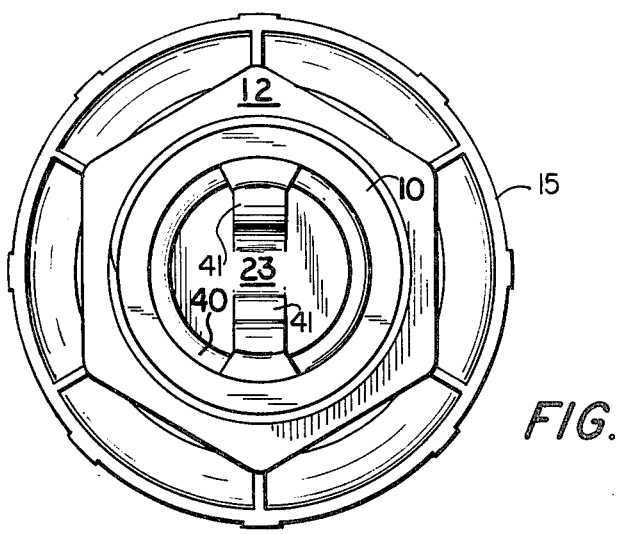
FIG. 3 is an end view of the valve shown in FIG. 1 taken from line 3—3.
Figure 4:
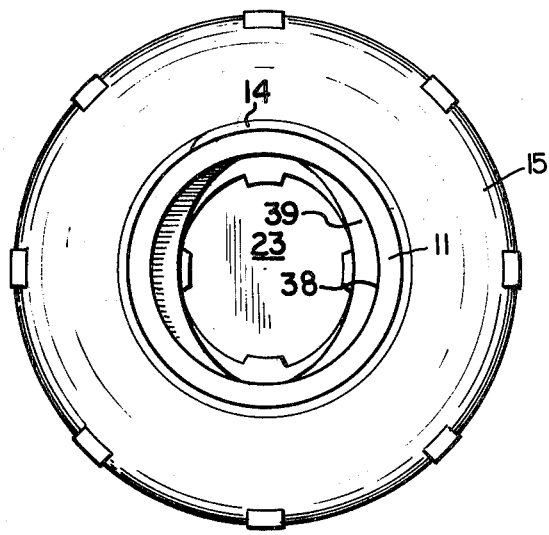
FIG. 4 is an end view taken on line 4—4 of FIG. 1.
Figure 5:
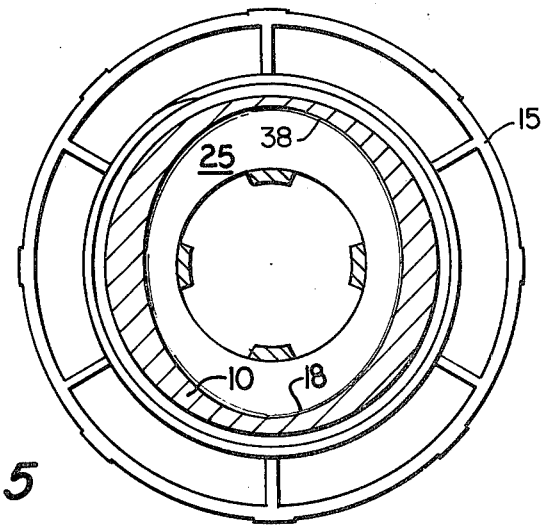
FIG. 5 is a cross-sectional view taken on line 5—5 of FIG. 2.

Now, with more particular reference to the drawings, the valve shown has a body 10 and a sleeve 11 telescopically received in the body 10. The body 10 has a hollow inlet end 19 and the sleeve 11 has a hollow outlet end 20 providing a flow passage. Apertures 24 are provided in the end of the sleeve 11 adjacent the partition 23. The partition 23 closes the end of the sleeve 11, and when the sleeve 11 is in the closed position, the partition 23 blocks the flow passage and no liquid is permitted to move through the valves. When the valve 11 is moved to the open position, the O-ring 16 moves out of engagement of the inner periphery 36 of the body 10 and liquid can flow through the inlet 19 around the partition 23 into the internal counterbore 18 in the body 10 and through the apertures 24 in the sleeve 11 to the outlet end 20. The hand wheel 15 threadably engages the body 10 with the threads 37 and engages the sleeve 11 at the groove 22. By turning the hand wheel 15 further onto the threads 37, the sleeve 11 is moved toward the closed position. The full-closed position is shown in FIG. 1. By turning the hand wheel 15 further off of the threads 37, the sleeve 11 is moved toward the open position. Hooks 41 on the sleeve 11 engage the shoulder 40 on the body 10 when the valve is in the full-open position to prevent the hand wheel from running off of the end of the threads 37 on the body 10 as shown in FIG. 2. The body has external threads 13 which may be connected to a water heater or the like and external threads 27 which mate with the internal threads on the hand wheel 15. An external groove 35 is formed in the body 10 which receives an O-ring 16 as shown. The O-ring 16 makes sliding contact with the inner cylindrical periphery 36 of the body 10. The body 10 has notches 28 formed in it at the inner edge of the inner periphery 36. Water can drain through these notches as the sleeve is moved to the open or closed position. The notches 28 permit a gradual increase or decrease in the flow of fluid through the valve as the valve is being opened or closed. Thus, accurate regulation of the amount of flow is permitted with this valve. The internal counterbore 18 is formed in the sleeve 11. O-ring 21 is received in groove 29. O-ring 21 makes sliding contact with the internal surface defining counterbore 18.

The hand wheel 15 has internal threads 37 forming a nut which engages the external threads 27 on the body 10. The sleeve 11 has a smooth internal cylindrical bore 38 which is closed at the upstream end by the partition 23. The laterally disposed apertures 24 allow water to flow outward and around the closed partition 23 when the sleeve is moved to the open position. Hand wheel 15 has a flange 31 which is received in groove 22 in the sleeve 11. To assemble the hand wheel 15 on the body 10, the threaded end 14 of the sleeve 11 is inserted in the opening in flange 31 of the hand wheel 15 from the end having threads 37. The flange 31 will be made of a material such as nylon which is slightly resilient and will slide up the inclined surface 32 and snap into the groove 22. The flange 31 rests in the groove 22 and against the retaining shoulder 30 in the sleeve 11.

The body 10 has an external hexagonal portion 12 suitable for attaching a wrench or other tool. From the hexagonal portion 12 to the end 17, the exterior of the body 10 is generally circular. The internal counterbore 18 in the body 10 is generally oval in cross-section. The exterior of section 39 of sleeve 11 from the shoulder 30 to the partition 25 is generally oval in cross-section. Thus, the sleeve 11 cannot rotate relative to the body 10. The internal bore 28 in the sleeve 11 can be circular or oval in cross-section. The outlet end 20 of the sleeve 11 is circular in cross-section.

When the hand wheel 15 is rotated in either direction, the body 10 and sleeve 11 are restrained against relative rotation by the oval-shaped parts that mate. As the hand wheel 15 is unscrewed from the threads 27, the flange 31 pushes against the side of groove 22 adjacent the shoulder 30 and pushes the body axially away from the sleeve thus opening the valve. In the full open position, hooks 41 engage the shoulder 40 limiting further movement. As the hand wheel 15 is screwed onto the threads 27, the flange 31 pushes against the side of groove 22 opposite the shoulder 30 and pulls the body axially toward the sleeve and thus closes the valve. In the full closed position, the partition 25 engages the ridges 26 limiting further movement. The valve is assembled as follows: The sleeve 11 is inserted into the threaded end of the body 10 and the hooks 41 will slidably engage the inclined surface 26. The sleeve 11 is then forced further into the body 10 and the hooks 41 will slide inwardly along the inclined surface 26 and snap over the shoulder 40. The hand wheel 15 will, by this time, have reached the threads 27 and it can be rotated, thereby forcing the valve to closed position with the O-ring 16 engaging the internal cylindrical surface 36.

The valve can be opened by rotating the hand wheel in the opposite direction until the hooks 42 again engage the shoulder 40.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising,
   a hollow body (10) adapted to be connected to a source of liquid,
   said hollow body (10) having a first oval-shaped portion therein,
   and a sleeve (11) having a second oval-shaped portion (39) slidably received in said body (10) whereby said sleeve (11) is restrained against rotation,
   an external groove (29) in said sleeve (11),
   a first O-ring (21) in said groove (29),
   said body (10) having a portion slidably engaging said first O-ring (21) providing a seal against the flow of liquid between said sleeve and said body,
   a reduced size cylindrical portion on said sleeve (11),
   an outer peripheral groove (35) in said reduced size cylindrical portion,
   a second O-ring (16) in said outer peripheral groove,
   a partition (23) closing the end of said reduced size cylindrical portion,
   said body (10) having a second portion attached to said first oval-shaped portion,
   said second portion having a reduced size internal cylindrical surface slidably receiving said first mentioned reduced size cylindrical portion forming a sealing engagement with said second O-ring when said sleeve is in a first position relative to said body,
   said second reduced size cylindrical portion terminating in a shoulder (40),
   said sleeve (11) being adapted to be moved to a second position moving said second O-ring (16) out of engagement with said body in said second position whereby a flow path is provided through said valve,
   and elongated axially extending arms integrally attached to said first reduced size cylindrical portion and hooks on the distal ends of said arms, said hooks engaging said shoulder (40) on said body when said sleeve and body are moved to said second position relative to each other limiting the relative sliding of said sleeve (11) at said second position whereby a flow path is established through said valve.

* * * * *